(12) United States Patent
Schneider et al.

(10) Patent No.: US 12,485,514 B2
(45) Date of Patent: Dec. 2, 2025

(54) BLOCK MOLD AND APPARATUS FOR BLOCKING A LENS

(71) Applicant: Schneider GmbH & Co. KG, Fronhausen (DE)

(72) Inventors: Gunter Schneider, Marburg (DE); Klaus Hofmann, Wehrheim (DE)

(73) Assignee: Schneider GmbH & Co. KG, Fronhausen (DE)

( * ) Notice: Subject to any disclaimer, the term of this patent is extended or adjusted under 35 U.S.C. 154(b) by 620 days.

(21) Appl. No.: 17/732,122

(22) Filed: Apr. 28, 2022

(65) Prior Publication Data

US 2022/0355434 A1  Nov. 10, 2022

(30) Foreign Application Priority Data

May 5, 2021 (DE) ..................... 10 2021 002 381.1

(51) Int. Cl.
*B24B 13/005* (2006.01)
*B24B 55/02* (2006.01)

(52) U.S. Cl.
CPC ...... *B24B 13/0052* (2013.01); *B24B 13/0057* (2013.01); *B24B 55/02* (2013.01)

(58) Field of Classification Search
CPC . B24B 13/0052; B24B 13/0057; B24B 55/02; B24B 13/00; B24B 13/0006; B24B 13/0012; B24B 13/0018; B24B 13/0025; B24B 13/005; B24B 13/0055; B24B 9/14; B24B 9/142

USPC ............ 451/384, 390, 921, 42, 43, 449, 488
See application file for complete search history.

(56) References Cited

U.S. PATENT DOCUMENTS

| | | | | |
|---|---|---|---|---|
| 3,874,124 A | * | 4/1975 | Morgan | ................ B24B 13/00 451/325 |
| 2004/0231958 A1 | * | 11/2004 | Miyazawa | ............. B23Q 3/062 198/346.3 |
| 2020/0215657 A1 | | 7/2020 | Schneider et al. | |

FOREIGN PATENT DOCUMENTS

| | | |
|---|---|---|
| CN | 109848795 A | 6/2019 |
| DE | 3930503 C2 | 10/1991 |
| DE | 102004021696 A1 | 11/2005 |
| DE | 102007007161 A1 | 8/2008 |
| DE | 102011011418 A1 | 8/2012 |
| DE | 102017001794 A1 | 8/2018 |
| KR | 20110004840 U | 5/2011 |

* cited by examiner

*Primary Examiner* — Robert F Neibaur
*Assistant Examiner* — Jason Khalil Hawkins
(74) *Attorney, Agent, or Firm* — Jason H. Vick; Amped IP LLC

(57) ABSTRACT

An apparatus and a block mold for blocking a lens are proposed, wherein the lens is blocked on a block piece by means of a block material. The space between the lens and the block piece is laterally delimited by a block mold. The block mold is preferably plate-shaped and has a plurality of block openings for forming different block sizes and has an integrated coolant channel. This enables easy and fast changing between different block sizes and very good cooling.

19 Claims, 9 Drawing Sheets

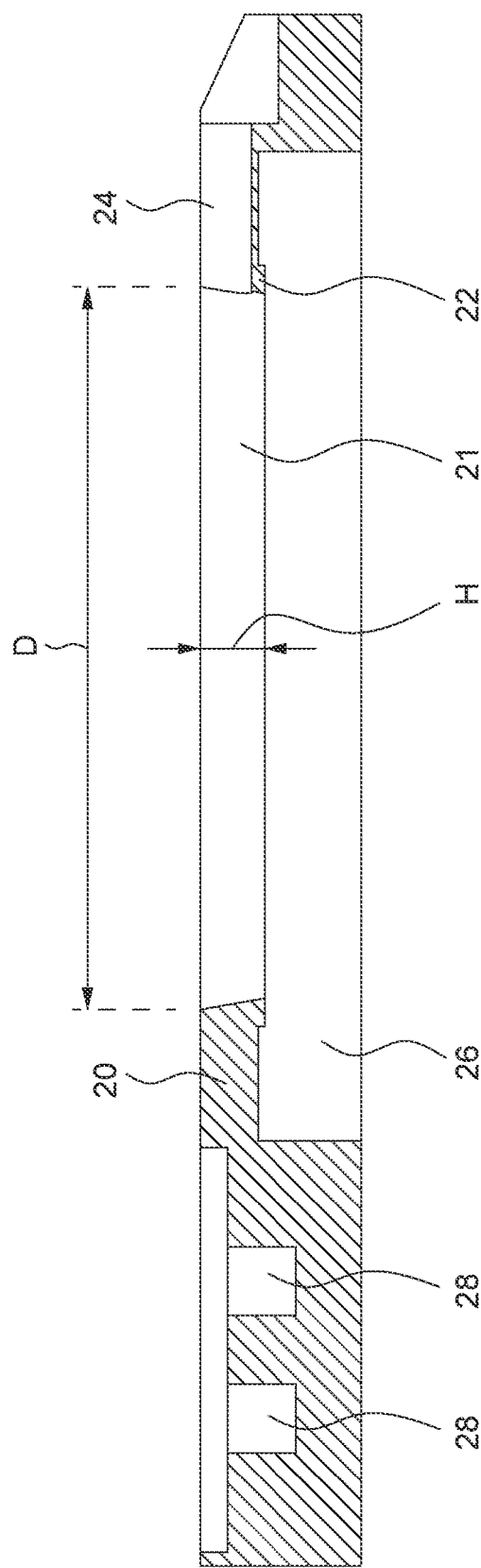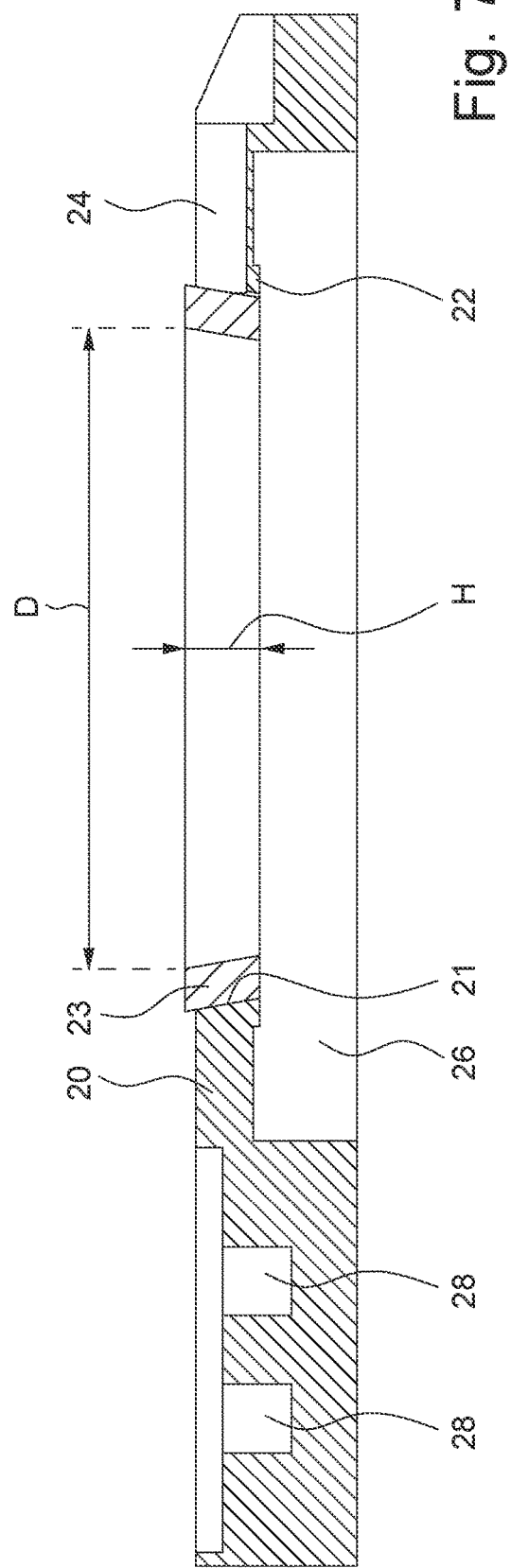

BLOCK MOLD AND APPARATUS FOR BLOCKING A LENS

CROSS-REFERENCE TO RELATED APPLICATIONS

This application claims the benefit under 35 U.S.C. 119(a) to German Patent Application No. 10 2021 002 381.1, filed 5 May 2021, the disclosure of which is incorporated herein by reference in its entirety.

BACKGROUND

The present invention relates to an apparatus for blocking a lens and to a block mold for blocking a lens.

Lenses, in particular spectacle lenses, are usually blocked, i.e. fixed or held, on a solo called block piece as a holder by means of a so-called block material. The block piece is used to hold the lens attached thereto—i.e. the blocked lens—in a very precise and defined manner for one or more processing(s). The lens is afterwards unblocked again, i.e. released from the block piece. With a view to cost-effective lens production, blocking and unblocking are to be performed efficiently and quickly in a simple manner.

Alloys with a low melting temperature or thermoplastics, i.e. thermoplastic materials, or non-thermoplastic materials, in particular curing adhesives, can be used as block material. Depending on the block material used, there are different requirements and/or process sequences when blocking the lens on the block piece by means of the block material.

Depending on the diameter of the lens and/or the block piece and/or depending on the curvature of the side of the lens to be blocked, a different diameter and/or a different height is required or desirable for connecting the lens and the block piece by means of the block material, i.e. a different block size. Accordingly, a change of the block mold determining the block size is then also necessary, in particular when blocking with alloys as block material.

German Patent DE 39 30 503 C2 discloses an apparatus for blocking a lens by means of a metallic block material on a block piece. The block piece is held in a rotatable receptacle. The space between the lens and the block piece is laterally delimited by a plate-shaped block mold for the block material. The block mold can be tilted via positioning drives by means of a motor and supports the lens to be blocked. Replacing the block mold to realize different block sizes would be very costly and complex due to the positioning drives and is not provided for.

German Patent Application DE 10 2004 021 696 A1 discloses an apparatus for blocking lenses on a block piece by means of a block material in the form of an alloy. A receptacle referred to as a block-on mold holds the respective block piece. A support ring can be removed by means of a robot arm from a magazine with different support rings and positioned on a position bearing above the receptacle or block piece. The support ring serves as a support for the lens to be blocked and laterally delimits the space between the lens and the block piece for the block material to be filled in, thus forming a casting mold or block mold. The robot arm is also used to manipulate and position the lenses in different processing units, such as a coating unit for applying a film to the lens and a recognition unit for reading out the lens type or determining the relative rotational position of the lens to the block piece or support ring. Changing the support rings is time-consuming and reduces throughput.

German Patent Application DE 10 2011 011 418 A1 discloses a magazine for block pieces, wherein the block pieces are held available in tubular magazine units. The block pieces are removed individually from below and rotated into a desired rotational position, the rotational position of the block piece being detected by means of a detection unit. The aligned block piece is then fed to a block station.

SUMMARY

Object of the present invention is to provide an apparatus and a block mold for blocking a lens, wherein a particularly simple change of the block size and/or a simple and/or low-cost structure and/or a fast blocking with high throughput is/are made possible.

The above object is solved by a block mold or by an apparatus as disclosed herein.

A first aspect of the present invention is that the apparatus or its block station preferably comprises a block mold (casting mold) with multiple block openings for forming different block sizes. Thus, a change from one block opening to another for the realization of a different block size becomes possible very easily and quickly, wherein in particular a time-consuming retooling or exchanging of the block mold can be avoided.

The different block sizes differ in particular with regard to diameter, shape (contour) and/or axial height, in order, for example, to be able to optimally attach the respective lens to the block piece depending on the lens diameter and/or the lens thickness variation and/or the lens curvature and to hold it for subsequent processings.

A quick change of the block size allows a high throughput even when processing different lenses and a quick adaptation to the respective requirements.

Particularly preferably, the block openings are arranged one behind the other and/or in series, so that it is possible to change very quickly from one block opening to the next block opening, in particular by rotating or linearly moving or shifting the block mold. This is also conducive to simple implementation, compact design and high throughput.

The block openings and/or—in particular annular—block inserts which can be or are received/accommodated therein preferably differ in their inside diameter and/or their axial height and/or, where appropriate, in their inside contour in order to produce correspondingly different block sizes.

A proposed use of a block mold for blocking a lens on a block piece by means of a block material, in particular an alloy, is characterized in particular by the block mold having a plurality of block openings which are differently designed/formed and/or provided with different block inserts to form different block sizes, one block opening of the block mold being selected and used for blocking the lens, thus the selected block opening and/or a block insert assigned thereto laterally delimits or defines the space between the lens and the block piece for the block material during blocking. This results in corresponding advantages.

The block mold is preferably at least essentially plate-shaped. This permits simple production and/or optimized cooling, since in particular a large surface area and thus cooling area is formed. Good cooling is in fact conducive to rapid solidification of the block material and thus to high throughput.

According to a second aspect of the present invention, which can also be implemented independently, the block mold preferably comprises at least one coolant channel. This allows the block mold to be cooled very easily and effectively. This in turn is conducive to a high throughput during blocking.

The preferred combination of the preferably integrated coolant channel with an at least essentially plate-shaped design/form of the block mold permits particularly effective cooling and simple implementation.

According to a third aspect of the present invention, which can also be implemented independently, the apparatus preferably comprises a switching drive or changing drive for exclusively moving the block mold and/or for exclusively switching or changing between different block openings of the block mold and thus block sizes. This in turn is conducive to a simple and fast change from one block opening to another for the realization of a different block size and thus also to a high throughput.

Particularly preferably, the apparatus or its block station has a switching device or changing device with the changing drive and a guide, wherein the guide is designed in particular as a linear guide and/or the block mold is detachably connected to the guide. This allows a simple construction and/or a quick change of the block mold.

In particular, the changing device is provided exclusively for changing between different block openings of the block mold, so that a change does not slow down the throughput.

According to a fourth aspect of the present invention, which can also be implemented independently, the apparatus preferably has two block stations along and/or parallel to a linear axis for loading with lenses to be blocked, for charging or feeding with block pieces and/or for unloading blocked lenses. This allows for a compact and/or simple construction with high throughput.

According to a fifth aspect of the present invention, which can also be implemented independently, the apparatus preferably has a loading device for loading the block station(s) with lenses to be blocked and/or an unloading device, operating in particular independently of the loading device, for unloading the block station(s) from blocked lenses and/or a charging device or feeding device, operating in particular independently of the loading device, for charging or feeding the block station(s) with block pieces, in particular wherein at least two of the devices have a linear axis and these run particularly preferably parallel to one another. This in turn is conducive to a simple construction and/or a high throughput.

In particular, a combination of the fourth and fifth aspects enables a simple construction with high throughput as well as optimized handling.

According to a sixth aspect of the present invention, which can also be implemented independently, the apparatus preferably has a magazine for, in particular stacked, block pieces and a charging device or feeding device for removing the block pieces, in particular taking them out of the magazine, one by one, in particular from above. This enables a simple structure with a high throughput, in particular if the feeding device operates independently of the loading device and/or unloading device.

Individual ones of the foregoing and subsequent aspects and features of the present invention may be combined with each other in any desired manner, but may also be implemented independently of each other.

Further aspects, features, advantages and characteristics of the present invention will be apparent from the claims and the following description of a preferred embodiment with reference to the drawings.

BRIEF DESCRIPTION OF THE DRAWINGS

FIG. 6 a schematic section of the block mold;

FIG. 7 a schematic section of the block mold with an optional block insert;

DETAILED DESCRIPTION

In the figures, the same reference signs are used for the same components and parts, resulting in corresponding properties and advantages, even if a repeated description is omitted.

Figure 1:
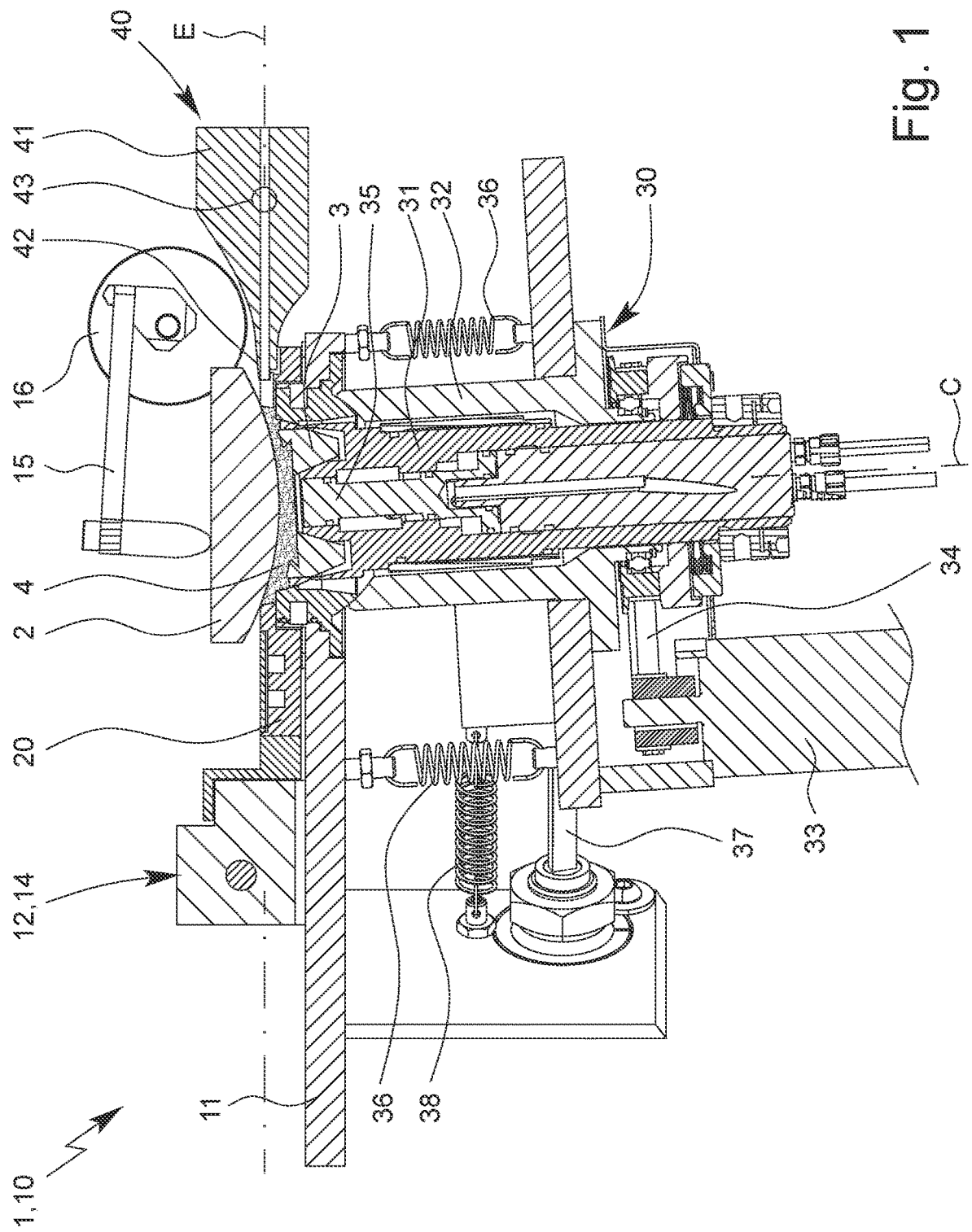
FIG. 1 a schematic section of a part of a proposed apparatus or block station for blocking a lens on a block piece by means of a proposed block mold.

FIG. 1 shows in a schematic section a proposed apparatus 1 or block station 10 for blocking—i.e. temporarily fixing—a lens 2 on a block piece 3. Preferably, the apparatus 1 is designed in such a way that multiple lenses 2 can be blocked successively and/or at least partially overlapping in time, for example by multiple block stations 10 and/or by blocking of lenses 2 in pairs in one block station 10.

Particularly preferably, the lens 2 is a so-called spectacle lens or eyeglass lens, i.e. a lens for spectacles or eyeglasses.

The lens 2 preferably consists of plastic, but can also consists of glass or the like where appropriate.

The lens 2 preferably has a diameter of several centimeters, in particular more than 3 centimeters.

According to the proposal, the lens 2 is blocked, i.e. temporarily fixed, on the associated block piece 3 by means of a block medium or block material 4.

The block material 4 is particularly preferably a (metallic) alloy, in particular with a melting point of below 80° C. Optionally, however, it can also be another material.

Optionally, a protective layer, for example a protective lacquer or a protective film, is arranged or provided on the block side of the lens 2 and/or the side of the lens 2 facing the block material 4/block piece 3. This serves in particular to protect this flat side or block side of the lens 2 facing the block piece 3, which side in particular has already been finished and/or formed.

Figure 2:
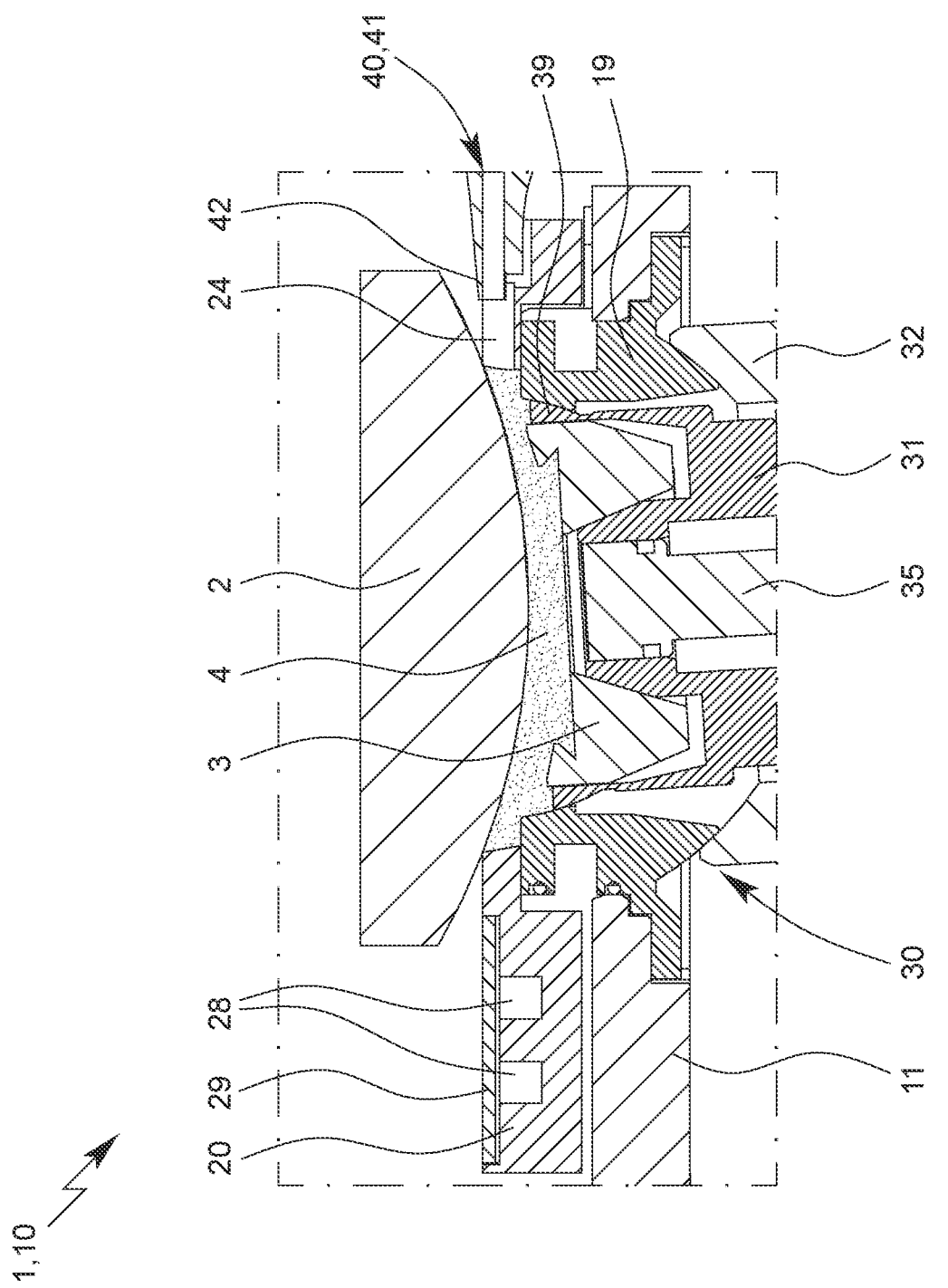
FIG. 2 an enlarged detail of FIG. 1.

FIG. 2 shows an enlarged detail of FIG. 1. In the schematic section according to FIGS. 1 and 2, the lens 2 is already blocked, thus connected to the block piece 3 by means of the block material 4.

The space between the block piece 3 and the lens 2, which is filled with the block material 4 and forms the "block" in the blocked state, is bounded, delimited or defined laterally and/or circumferentially by a block form or block mold 20, which in particular forms a casting mold for the block material 4 and determines the size (in particular shape, diameter and axial height) of the block, i.e. the block size. Furthermore, the block mold 20 preferably forms a support for the lens 2 during blocking.

The apparatus 1 or block station 10 has a receptacle 30 for the block piece 3 in order to hold the block piece 3 for blocking—in particular with desired orientation and/or tilting position and/or rotational position relative to the lens 2.

The block piece 3 is designed in particular on its side facing away from the lens 2 to be clamped with a defined rotational position for processing the associated lens 2. For blocking, the block piece 3 is held in particular by the receptacle 30 of the apparatus 1 or block station 10 in a defined position relative to the lens 2.

The receptacle 30 holds the block piece 3 on one side (here the bottom side) of the block mold 20 and the lens 2 to be blocked is arranged on the other side (here the top side) of the block mold 20, so that the block mold 20 with the inner wall of a block opening 21 at least substantially laterally and/or circumferentially limits the block space or intermediate space between the lens 2 and the block piece 3.

The apparatus 1 or block station 10 preferably has a block medium feed or block material feed 40 and/or a feed head 41 for feeding block medium or block material 4 into the intermediate space and/or into the block mold 20, as schematically indicated in FIG. 1.

The feed head 41 can feed the block material 4 to the intermediate space or block space between the lens 2 and the block piece 3, in particular via a feed tip 42.

The feed head 41 is preferably provided with a shut-off valve 43 arranged in the vicinity of the outlet in order to be able to immediately shut off the block material feed 40 if required.

The feed head 41 can preferably be supplied with the block material 4 via a block medium line or block material line 44.

Figure 3:
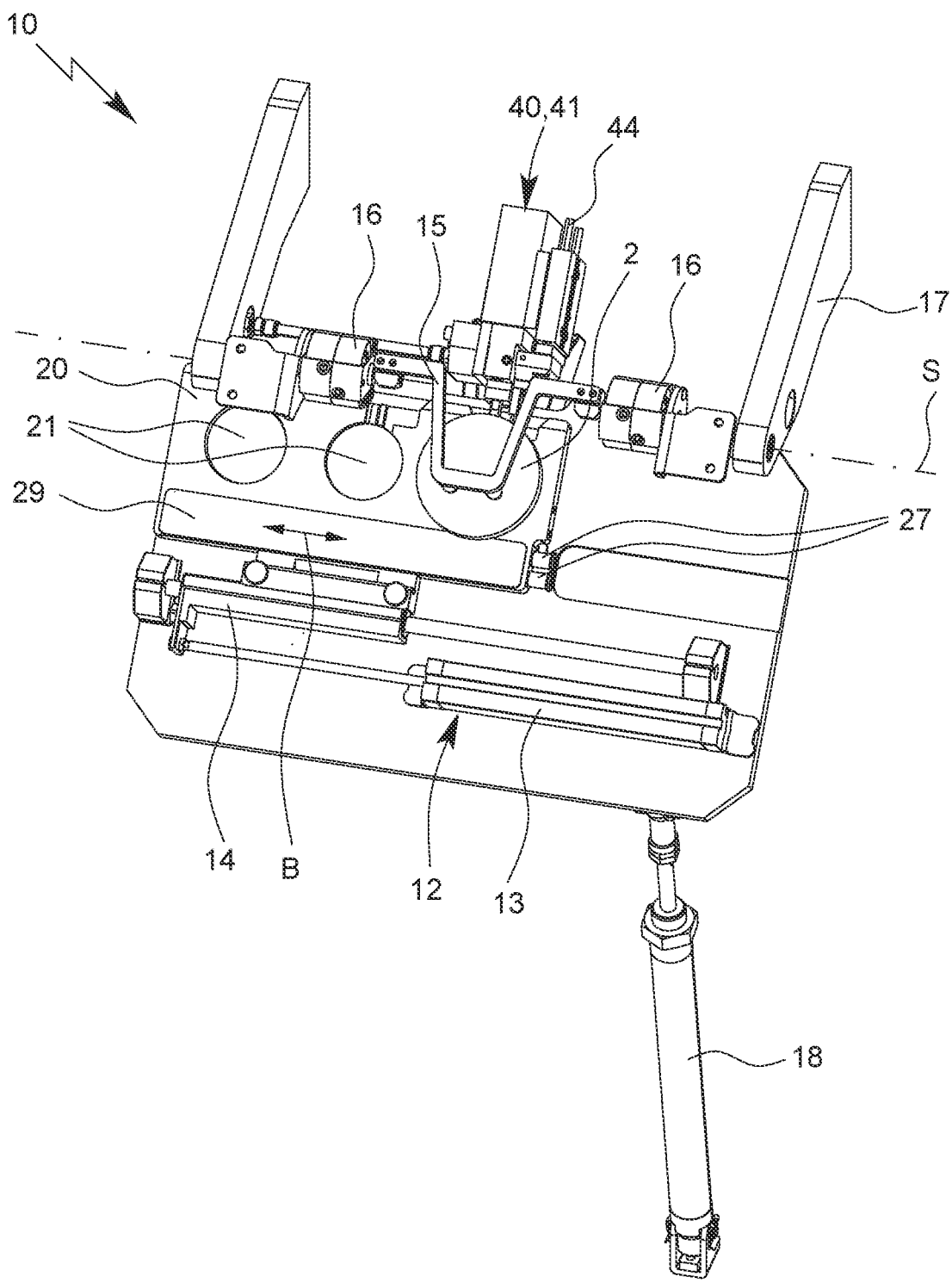
FIG. 3 a perspective view of the block station.

FIG. 3 shows in a schematic perspective view a part of the proposed apparatus 1 or the block station 10 in a tilted position or inclined blocking position preferred for blocking or filling in of the block material 4.

The apparatus 1 or block station 10 preferably has an in particular plate-shaped carrier 11 on which the block mold 20 is or will be arranged. In particular, the carrier 11 forms a bearing plate or base plate for the block mold 20 and/or holder for the receptacle 30.

In particular, the carrier 11 has an opening or aperture to form the block space and/or to receive the receptacle 30 and/or the block piece 3 and/or to be able to connect the block piece 3 directly to the lens 2 via the block material 4. In the illustration example, a connection part 19, in particular an annular connection part 19, is preferably arranged in the opening/aperture.

Figure 4:
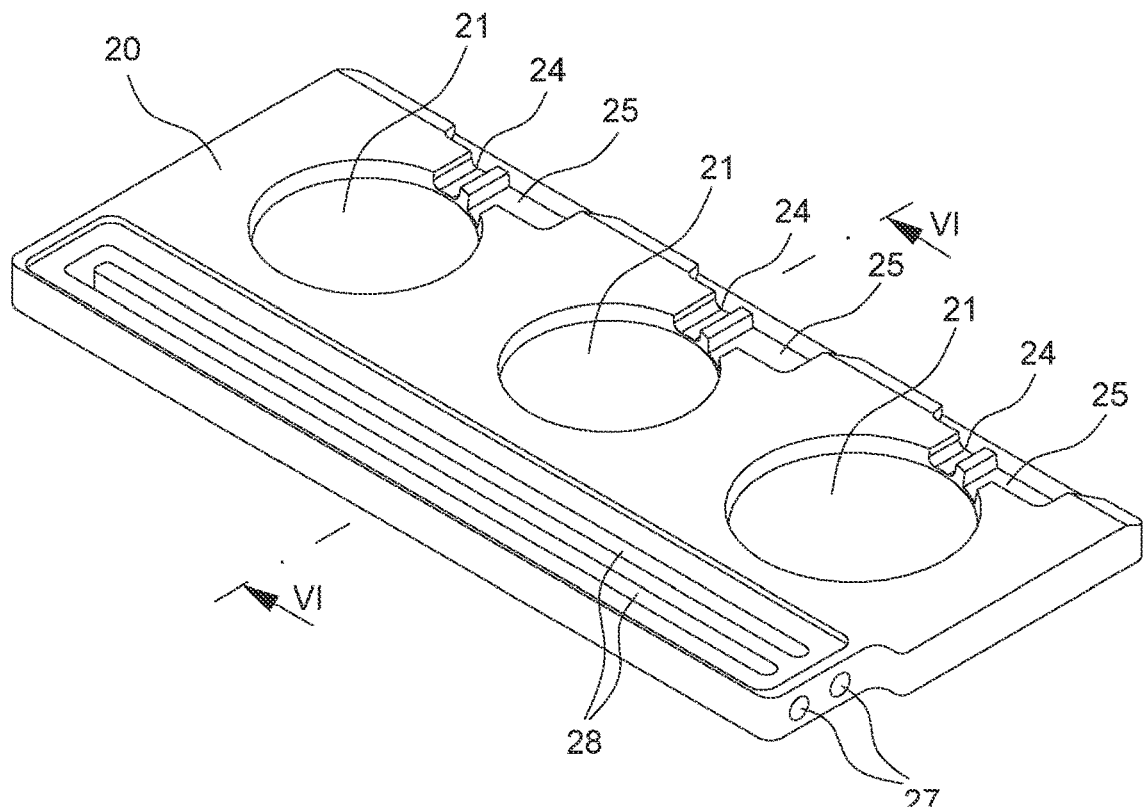
FIG. 4 a perspective view of the block mold from above.
Figure 5:
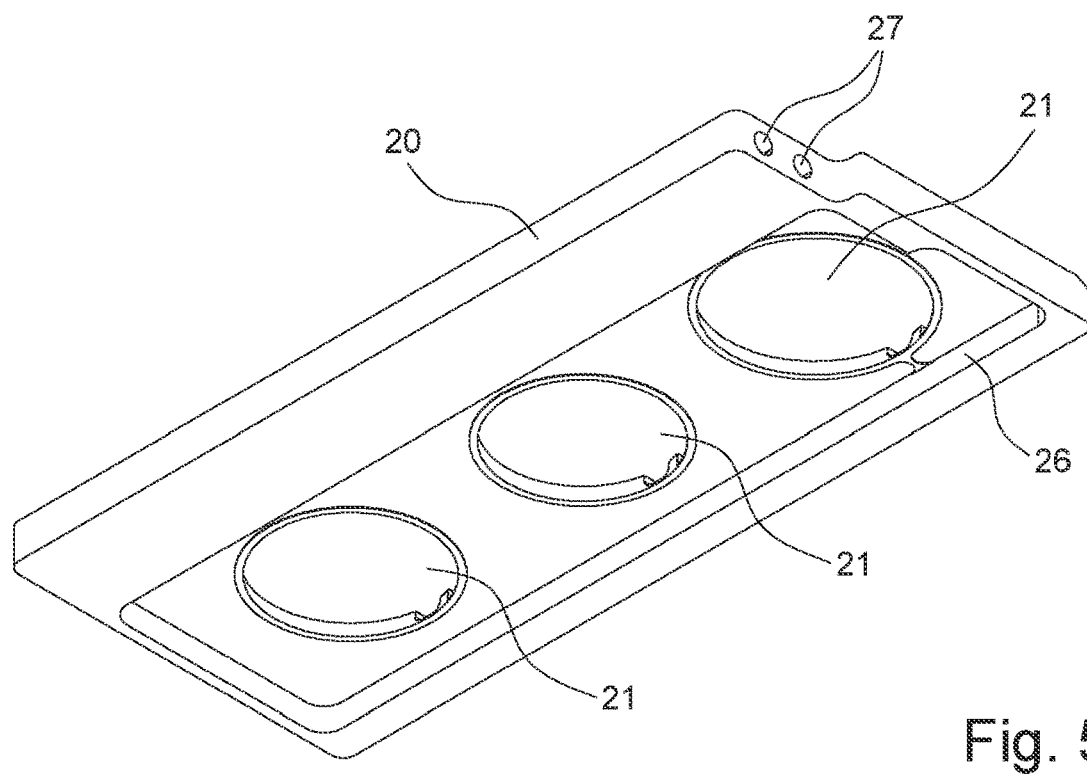
FIG. 5 a perspective view of the block mold from below.

The block mold 20 preferably has a plurality of block openings 21, in particular two or three block openings 21, for forming different block sizes, as indicated in FIGS. 3, 4 and 5, wherein FIGS. 4 and 5 show the proposed block mold 20 in a perspective from above and below, respectively.

The block mold 20 is preferably at least substantially plate-shaped and/or at least substantially planar on at least one flat side.

The block mold 20 is preferably formed in one piece or at least substantially in one piece.

The block mold 20 is preferably made of or consists of metal, in particular aluminum, or another material that is a good conductor of heat with respect to good heat dissipation.

The block openings 21 are preferably designed as apertures.

The block openings 21 are preferably circular in plan view. However, the block openings 21 can also have a different inner contour if required.

FIG. 6 shows the block mold 20 or a block opening 21 in a schematic section.

The block openings 21 preferably differ with respect to their diameter (inner diameter) D and/or with respect to their axial height H and/or by their inner contour in plan view to produce different block sizes.

Optionally, the respective block size and/or the respective diameter D can be indicated on the block mold 20 adjacent to the respective block opening 21—for example by numbers.

The diameter D is preferably taken to be that diameter of the block opening 21 which is adjacent to the lens 2 and/or where the block opening 21 or block mold 20 forms its support edge for the lens 2. In this context, it should be noted that the block opening 21 preferably tapers conically starting from the support side of the lens 2. This makes it easier to demold, thus remove the blocked lens 2 together with the block material 4 and the block piece 3, upward in the illustration according to FIGS. 1, 2 and 6.

The lens diameter is larger than the diameter D of the selected block opening 21, so that the lens 2 can rest and be supported on the edge of the block opening 21 for blocking.

In the example shown, the block mold 20 or block opening 21 optionally has an edge (collar) 22 which in particular protrudes (axially) and which in particular determines the axial height H of the block mold 20 or block opening 21 and thus the block size in the axial direction and/or in particular forms a support or contact for the block piece 3 not shown in FIG. 6 during blocking.

The edge 22 serves in particular to seal the casting chamber downward and/or toward the block piece 3. This will be discussed in more detail later.

Preferably, the block opening 21 or each block opening 21 is provided with the protruding edge 22 on its lower side and/or on the side facing away from the lens 2. Alternatively or additionally, however, a corresponding edge 22 can also be provided on the upper side and/or on the side facing the lens 2 and, if necessary, form the contact surface or contact edge for the lens 2 during blocking.

Alternatively or additionally, one or more block openings 21 can optionally be provided with a block insert 23, as indicated in a schematic section of the block mold 20 according to FIG. 7, so that different block sizes also result when blocking with the respective block opening 21 compared to another block opening 21, in particular due to different sizes, such as axial height H, inner diameter D and/or different inner contour.

Optionally, the block insert 23 protrudes axially, for example upward or toward the lens 2, as indicated in FIG. 7.

Preferably, the block insert 23 forms the support or contact edge for the lens 2 for blocking.

The walls of the block openings 21 and/or of the respective block insert 23 thus form a casting chamber border for the block material 4 during blocking.

The block mold 20 preferably has a lateral feed opening 24, in particular in the form of a groove-like or slot-like depression or recess and/or in the form of a radial channel, and optionally a lateral and/or parallel outlet or overflow 25, preferably separately for each block opening 21, as indicated in particular in FIG. 4.

To feed the block material 4 into the block space and/or into the block mold 20, the feed head 41 is insertable into the feed opening 24, in particular with its correspondingly formed feed tip 42, as indicated in FIG. 1/2. If a block insert 23 is provided, it has a corresponding opening in extension of the feed opening 24 so that the block material 4 can flow into the block space and/or into the block mold 20 in the desired manner.

The overflow 25 allows excess block material 4 to escape and/or control of the filling with block material 4.

The overflow 25 is preferably arranged adjacent to the feed opening 24 of the respective block opening 21 and/or, in particular, designed as a groove-like or slot-like or trough-like recess or depression and/or as a radial channel.

The walls of the block openings 21 and/or of the respective block insert 23 thus form a casting chamber border for the block material 4 during blocking.

In the illustrative example, the block mold 20 preferably has a recess 26 on the underside, as indicated in FIGS. 5 to 7, in particular for the connection part 19, as indicated in FIG. 1/2. This will be discussed in more detail later.

The block mold 20 is preferably—in particular also independently of the realization of one or more block openings 21—provided with at least one coolant connection 27 and/or a—in particular integrated—coolant channel 28, as indicated in particular in FIG. 4, in order to enable in particular direct cooling and/or liquid cooling of the block mold 20 and thus faster and/or more definite blocking.

In the illustrative example, the block mold 20 preferably has two coolant connections 27 for the supply and return of coolant, in particular a liquid coolant, via cooling lines or other fluidic connections not shown in FIG. 3.

The coolant channel 28 preferably extends in a U-shape and/or in a loop shape and/or in the direction of a main extension and/or adjacent to the block opening(s) 21 and/or at least substantially in a straight line in or at the block mold 20.

The coolant channel 28 is preferably formed by one or more holes or grooves in the block mold 20 or a plate-shaped base body of the block mold 20 and/or covered by a cover 29, as shown in FIGS. 1 to 3.

In the illustrative example, the cover 29 is preferably received in a recess of the block mold 20, in particular so that a largely smooth upper surface is formed, as indicated in FIG. 1/2. However, other constructive solutions are also possible.

Alternatively, the coolant channel 28 can also be formed only by one or more (bore) holes or other openings, which may be closed at the ends so that no (separate) cover 29 is required.

The apparatus 1 or block station 10 preferably has a switching device or changing device 12 for automated and/or motorized switching or changing between the block openings 21 and/or for selecting one of the block openings 21 and thus for selecting a desired block size for blocking, as shown in FIG. 3.

The changing device 12 is preferably designed exclusively for moving, in particular displacing, shifting and/or rotating, the block mold 20 relative to the carrier 11 and/or to the receptacle 30 in order to selectively align and/or position one of the block openings 21 above the receptacle 30 and/or coaxially thereto, depending on the desired block size.

In the example shown, there is preferably an in particular exclusively linear movement or displacement/shifting of the block mold 20 relative to the carrier 11 and/or to the receptacle 30 for changing from one block opening 21 to the other in the direction of movement B indicated in FIG. 3.

However, other movement, for example rotation or swiveling and/or movement superimposed on the linear movement, is also possible in principle.

Preferably, the movement for changing from one block opening 21 to the other is essentially or exclusively transverse to the lens axis and/or block piece axis and/or parallel to the block opening plane of the block openings 21 and/or plate plane E of the block mold 20 and/or of the carrier 11.

Instead of the aforementioned transverse displacement and/or rotation or turning in the aforementioned plane of movement, it is alternatively or additionally also possible to raise or lift (off) the block mold 20 from the carrier 11 and/or connection part 19.

In the illustrative example, the changing device 12 preferably has a switching drive or changing drive 13 and/or a guide 14.

The changing drive 13 is preferably designed as a linear drive and/or actuating cylinder, in particular a pneumatic or hydraulic cylinder. However, other technical implementations are also possible here.

The changing device 12 and/or changing drive 13 is preferably provided exclusively for moving the block mold 20 for changing between the block openings 21.

In the illustrative example, the changing device 12 and/or changing drive 13 is preferably arranged next to the guide 14 and/or on the side of the guide 14 facing away from the block mold 20 and/or on the carrier 11.

The guide 14 is preferably designed as a linear guide and/or preferably arranged on a longitudinal side of the block mold 20.

The guide 14 holds the block mold 20 preferably displaceably on the carrier 11 and/or in the block station 10.

The block mold 20 is preferably detachably or exchangeably connected or connectable, in particular screwed, to the guide 14 and/or changing device 12.

Connecting the block mold 20 to the guide 14 and/or changing device 12 and/or other components of the block station 10 is preferably done by means of a quick-release fastener, a connecting element, a screw or the like, as indicated only schematically in FIGS. 1 and 3, in order to enable the block mold 20 to be changed quickly and easily, in particular for cleaning purposes and/or for retooling or exchanging.

In the illustrative example, the guide 14 provided allows the block mold 20 to be lifted and/or folded away from the carrier 11 and/or connection part 19—for example manually—to enable easy cleaning, for example. This is enabled or made easier here in particular by the lateral arrangement of the guide 14 and/or alignment of the linear movement axis parallel to one side of the block mold 20.

Preferably, the block mold 20 rests only loosely and/or by its weight—in particular on the connection part 19—at least when changing from one block opening 21 to another opening 21.

In particular, the block mold 20 is guided displaceably only on one side and/or in the region of one edge and/or is guided or held movably substantially in its plate plane.

The direction of movement B or plane of movement E is preferably transverse or perpendicular to the central axis of the block opening(s) 21 and/or receptacle 30 and/or at least substantially parallel to the plate plane or main plane of the carrier 11, the block mold 20 and/or the lens 2 positioned for blocking. This preferred transverse movement results in several advantages.

The transverse movement allows a very simple and/or quick change from one block opening 21 to the next block opening 21, wherein a simple and/or compact structure is made possible.

The transverse movement is advantageous for counteracting soiling since a kind of self-cleaning effect is achieved.

Particularly preferably, the block mold 20, in particular with its edge 22, forms a relatively narrow and/or defined contact surface and/or planar seal to the connection part 19, wherein the block mold 20, in particular through the recess 26 and/or the connection part 19 and/or the carrier 11 is cut free outside the contact surface and/or sealing area, so that any block material residues that may occur or escape can be taken up and/or, in particular, pushed away by the transverse movement, in order to again achieve a good seal for the block material 4 between the block mold 20 and the connection part 19, also when changing from one block opening 21 to the other. However, other constructive solutions are also possible.

In the illustrated example, the connection part 19 is preferably inserted into or arranged on the carrier 11. However, the connection part 19 can also be formed directly by the carrier 11 or another component, as required.

In the example shown, the lens 2 is preferably blocked individually in the block station 10. However, blocking in pairs, thus simultaneous blocking of two lenses 2, is also possible, for example. The block mold 20 then preferably has two corresponding block openings 21. Alternatively, two block molds 20 can be assigned to one block station 10.

According to a further alternative, the block mold 20 may also be pivotable or rotatable, in particular in the form of a rotatable disk or plate, in order to selectively provide one or two block openings 21 for blocking and to change the block opening(s) 21 as required by rotating the block mold 20.

Preferably, in the illustrative example, an automatic and/or motorized moving of the block mold 20 and/changing of the block opening 21 is performed. Alternatively, however, this can also be done manually. In this case, for example, no changing drive 13 is required.

If required, the apparatus 1 or block station 10 or changing device 12 or guide 14 can also be provided with a detent and/or lock in order to secure the block mold 20 against movement, displacement, lifting and/or folding up when the block opening 21 is correctly and/or centrally positioned above the receptacle 30, in particular by positive or non-positive locking.

The apparatus 1 or block station 10 preferably has an in particular pivotable hold-down device 15 which fixes or holds the lens 2 in the desired position after the lens 2 has been positioned for blocking, thus in particular on the block mold 20 or the edge of the selected block opening 21 or the optionally provided block insert 23, as indicated by way of example in FIGS. 1 and 3.

Particularly preferably, the hold-down device 15 can be moved or actuated or pivoted in a desired manner via a holder drive 16, as schematically indicated in FIGS. 1 and 3, or the like, in particular so that the lens 2 is held in the desired position for blocking with a desired holding force or pretension/bias and/or the block mold 20 is fixed or pressed against the connection part 19.

The block station 10 can preferably assume a tilting position and/or block position, as indicated in FIG. 3, for blocking—more precisely for filling (in) the block material 4—so that the block material 4 supplied from the upper side via the feed opening 24 can fill the block space or intermediate space between lens 2 and block piece 3 as free of bubbles as possible and the air contained therein can escape unhindered, in particular via the overflow 25, so that the intermediate space is filled as completely as possible by the block material 4 before it solidifies or hardens.

Charging or feeding of the block station 10 with the block piece 3 to be blocked and the lens 2 to be blocked, on the other hand, preferably takes place with at least substantially horizontal alignment (in particular of the lens 2 and/or block mold 20 and/or of the carrier 11 and/or of the block piece 3) in a so-called feeding position and/or in a horizontal position. The blocked lens 2 is preferably also removed in the feeding position.

For changing between the feeding position and the tilting position and vice versa, the block station 10 and/or the carrier 11 is preferably tiltable about a swivel axis S and the apparatus 1 and/or block station 10 preferably has a corresponding swivel device, in particular a swivel bearing 17 and/or a swivel drive 18.

The swivel axis S preferably runs adjacent or parallel to a longitudinal edge or longitudinal axis of the carrier 11 and/or block mold 20.

In the example shown, the swivel bearing 17 preferably holds the carrier 11 essentially in the region of one longitudinal side and the swivel drive 18, such as an actuating cylinder or the like, acts in particular in the region of the other longitudinal side of the carrier 11. However, other constructive solutions are also possible.

In FIGS. 1 and 2, the block station 10 is shown with a substantially horizontal orientation for illustrative purposes. However, the filling with the block material 4 by means of the shown feed head 41 or by other means is preferably carried out in the mentioned tilted position, as already explained.

The receptacle 30 preferably has a holder 31 for holding the block piece 3, in particular in a defined rotational position.

The block piece 3 is preferably provided on its holding side and/or side facing away from the lens 2 with one or more projections, a recess, in particular a V-shaped groove, an orientation groove and/or other orientation means or the like, in order to enable holding or clamping in a processing machine not shown with a defined rotational position for processing the blocked lens 2. The holder 31 is correspondingly designed/constructed to receive the block piece 3 with defined rotational position and/or to hold it for blocking.

In particular, in the illustrative example, the holder 31 has on the end face a preferably annular receiving groove and/or centric recess, so that the block piece 3 in the received state is peripherally surrounded by the holder 31 and/or a holding region 39 of the holder 31 (cf. FIG. 2) with a relatively tight fit and/or, in particular, is held with a defined rotational position by axial/radial engagement.

In particular, the receptacle 30 has a—preferably at least substantially hollow cylindrical—bearing housing 32 for rotatably supporting or bearing the holder 31.

The holder 31 and the block piece 3 are rotatable about an axis of rotation C, preferably by means of a rotary drive 33, which is designed in particular as a servomotor and/or is coupled via a gear coupling or a gear 34, such as a toothed belt, a drive wheel and/or one or more toothed wheels, in such a way that the holder 31 and thus the block piece 3 is rotatable in a defined manner, preferably by up to 360°, and is positionable in a desired rotational position.

The rotary drive 33 is preferably arranged axially offset from the axis of rotation C and/or holder 31 and/or coupled to the holder 31 in such a way that the holder 31 can preferably be dismounted, in particular axially removed, without dismounting the rotary drive 33, for example for cleaning and maintenance purposes.

The holder 31 is preferably provided with an axially movable punch or plunger 35, which is assigned to the end receiving the block piece 3, in order to be able to close a central recess in the block piece 3 in a manner sealed against block material and/or to be able to cause or at least support an axial ejection or removal of the block piece 3 together with the blocked lens 2 after blocking—in the illustration in FIG. 1/2 by axial upward movement. Particularly preferably, the plunger 35 is pneumatically controlled and/or moved.

The receptacle 30 and/or the holder 31 with the block piece 3 is preferably tiltable from a non-tilted normal position (in which the central axis or axis of rotation C is perpendicular to the support plane and/or support edge of the block mold 20 and/or the corresponding block opening 21 for the lens 2 and/or perpendicular to the main or plate plane E of the block mold 20 and/or of the carrier 11) into a desired block position, as indicated in FIG. 1, in order to achieve a corresponding tilting between the lens 2 and the block piece 3 during blocking—in particular for a later prismatic correction by the lens 2.

In the illustrative example, the receptacle 30 and/or the bearing housing 32 is therefore preferably tiltably mounted or supported on the block station 10 and/or the carrier 11, in particular via the connection part 19 or another component.

The connection part 19 is preferably seated in a corresponding block opening or aperture of the carrier 11 and, in the illustrative example, preferably projects on the side facing the block mold 20, in particular in order to engage in the recess 26 thereof and/or to produce a preferably direct contact and/or a preferably planar or annular seal between the connection part 19 on the one hand and the block mold 20 or the edge 22 thereof on the other hand, so that the block material 4 does not escape undesirably during blocking.

The holder 31 or its holding region 39 preferably lies with its circumferential or outer surface against the inside of the connection part 19 in order to seal off the block space or casting space for the block material 4, in particular also in the tilted state. For this purpose, in particular a dome-like bearing or contact or dome guide is formed between the holder 31 or the holding region 39 on the one hand and the connection part 19 or another component associated with the carrier 11 on the other hand, as can be seen in particular from FIG. 2. In this way, an undesired escape of block material 4 can be avoided. However, other constructive solutions are also possible.

The connection part 19 is preferably at least substantially annular and/or projects axially on the side facing the bearing housing 32.

Particularly preferably, the connection part 19 together with the receptacle 30 and/or the bearing housing 32, which preferably lies against the outside of the connection part 19, additionally or alternatively forms a tilting bearing or spherical bearing, which allows the receptacle 30 to tilt from the normal position in all directions into the block position, particularly preferably coaxially with the bearing of the holding region 39 and/or the holder 31 in the connection part 19.

Particularly preferably, the tilting axis of the receptacle 30 and/or of the holder 31 lies at least substantially in the region of the block piece 3, here substantially in the region of the upper end or block-side end of the block piece 3.

In the illustration in FIG. 1, the receptacle 30 is tilted to the right.

The maximum tilt is preferably at least 4°, in particular about 5°, starting from the normal position.

According to a particularly preferred aspect, the receptacle 30 and/or the bearing housing 32 is held via one or more axial springs 36 and/or biased against the carrier 11 and/or the connection part 19. This allows for very easy assembly and disassembly and/or weight compensation.

For defined tilting of the receptacle 30, two actuating drives or actuators 37 are preferably provided (in FIG. 1, only one actuator 37 is shown on the left side), which act on the receptacle 30 or its bearing housing 32 or components connected thereto—transversely and/or radially to the axis of rotation C—offset by 90°. This offset allows tilting about any desired (orientation of) the tilting axis (running perpendicular to the axis of rotation C and/or parallel to the plate plane E of the carrier 11).

The actuators 37 preferably operate pneumatically.

The actuators 37 preferably act transversely to the axis of rotation C and/or via pressure plungers onto the receptacle 30 or the bearing housing 32 or components connected thereto. The resetting or return is preferably effected via return springs 38, as schematically indicated in FIG. 1. This results in a simple construction. However, other constructive solutions are also possible.

The receptacle 30 and/or the bearing housing 32, the rotary drive 33, the springs 36, the actuators 37 and/or the return springs 38 is or are preferably—indirectly or directly—arranged or mounted on or fastened to the block station 10 and/or the carrier 11—in particular on the side of the carrier 11 facing away from the block mold 20.

A particularly preferred design or structure of the proposed apparatus 1 is explained in more detail in the following with reference to the schematic top view according to FIG. 8.

The apparatus 1 has at least one block station 10, particularly preferably two or more block stations 10. The block stations 10 are preferably at least substantially similar or identical in structure, as already explained above.

Each block station 10 is preferably assigned its own feed head 41.

The feed head 41 preferably also has—in particular in addition to the feed tip 42 for the block material 4—a level sensor 45 for detecting the filling of the space between the lens 2 and the block piece 3 and/or the block mold 20 with block material 4. However, other constructive solutions are also possible.

Figure 8:
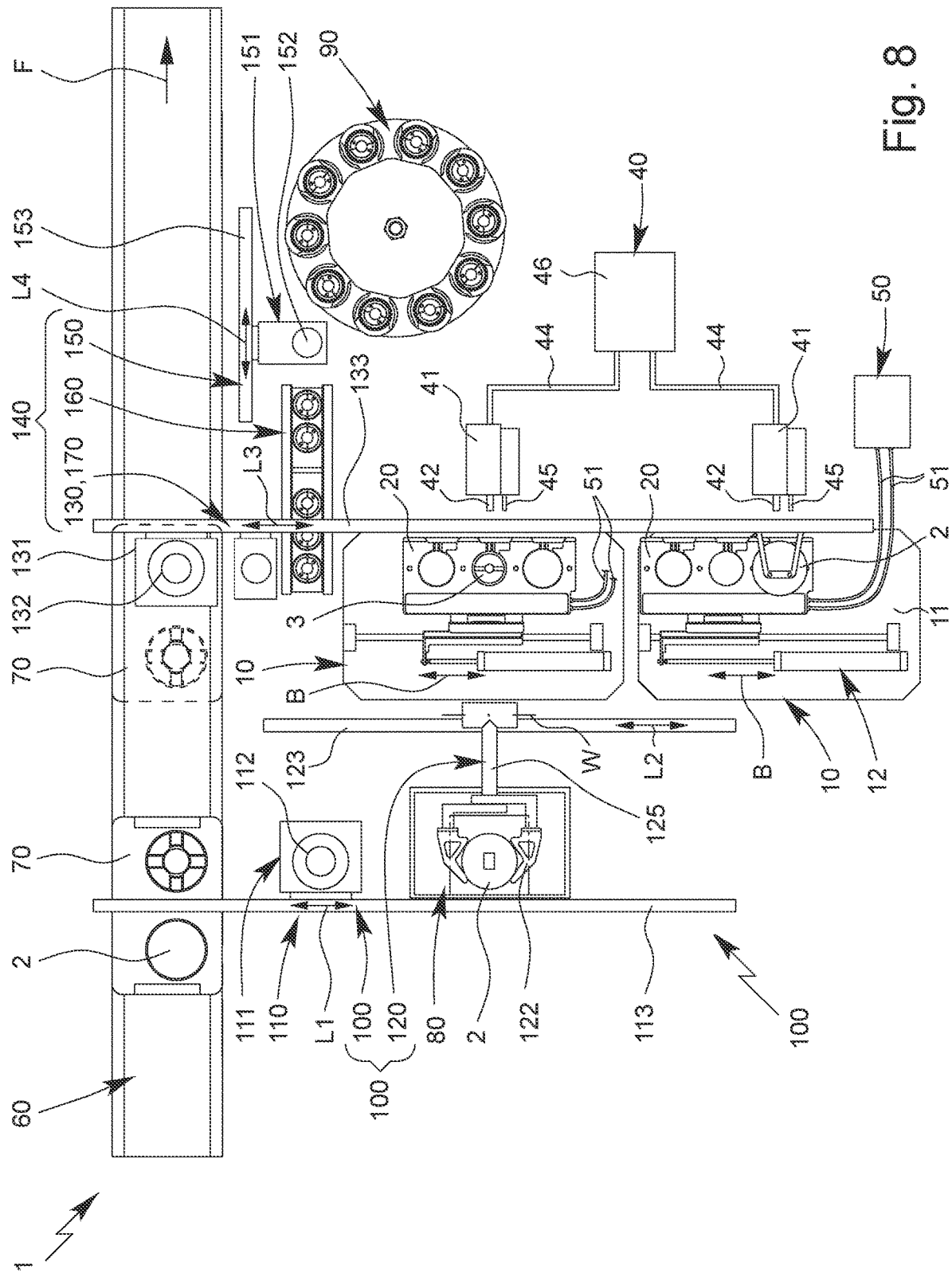
FIG. 8 a schematic top view of the apparatus.

The feed head 41 is preferably linearly movable from the feed position shown in FIG. 1/2 to an offset waiting position (as shown in FIG. 8) and vice versa, the axis or direction of movement preferably being parallel to the inclined main plane in the block position and/or in extension of the feed opening 24 of that block opening 21 which is located above the receptacle 30.

The block material feed 40 preferably has a reservoir 46, in particular a common reservoir 46, for the block material 4, so that the feed heads 41 can be supplied with the block material 4 via corresponding block material lines 44.

Preferably, the apparatus 1 comprises at least one cooling device 50 for supplying the block mold 20 or its coolant channel 28 with coolant. The cooling device 50 is connected in particular via coolant lines 51 to the coolant connections 27 and/or the coolant channel 28 of the respective block mold 20.

Due to the movability/displaceability of the block mold 20—in particular in the direction of movement B—and due to the preferred pivoting movement between the feeding position and the tilting position, the coolant feed or the coolant lines 51 must be designed correspondingly flexible and guided movably to allow these movements and at the same time maintain the coolant supply.

In FIG. 8, for reasons of simplification, only one connection of the coolant supply or cooling device 50 to the lower block station 10 or its block mold 20 is shown.

Preferably, the proposed apparatus 1 has a conveying device 60 for feeding lenses 2 to be blocked and/or conveying away blocked lenses 2.

The conveying device 60 is particularly preferably designed as a conveyor belt or band conveyor.

The lenses 2 to be blocked are preferably fed on or in transport carriers 70. Particularly preferably, the transport carriers 70 are designed as transport boxes and/or each serve to hold two lenses 2.

Preferably, the transport carriers 70 are also used for conveying away blocked lenses 2.

FIG. 8 shows a transport carrier 70 in an unloading position for removing a lens 2 to be blocked and with dashed lines in a loading position for loading a blocked lens 2. However, other constructive solutions are also possible. For example, other transport carriers 70 can be used for blocked lenses 2 than for lenses 2 to be blocked.

The apparatus 1 preferably has a measuring station 80 for the lenses 2 in order to "measure" the lenses 2, preferably individually, thus in particular to detect a rotational position and/or other position and/or marks, markings or the like, the position of an optical active surface (top or bottom) or the like.

The apparatus 1 preferably has a magazine 90 for block pieces 3.

The measuring station 80 and the magazine 90 are preferably arranged on opposite sides of the block station(s) 10 and/or, in the conveying direction F of the conveying device 60 (from left to right in the illustrative example according to FIG. 8), offset and/or one after the other.

Alternatively, the magazine 90 may be located adjacent to and/or on the same side as the measuring station 80 and/or upstream of the measuring station 80 and/or a loading device 100 in the conveying direction F.

The apparatus 1 preferably has a loading device 100 for feeding lenses 2 to be blocked to the block station(s) 10. In particular, the loading device 100 is designed in such a way that the lenses 2 are conveyed or transported—preferably individually—from the conveying device 60 and/or the transport carrier 70 to the respective block station 10 or first to the optional measuring station 80 and from there to the respective block station 10 or only from the measuring station 80 to the respective block station 10.

In particular, the loading device 100 picks up the lenses 2 from the respective transport carrier 70, conveys them first to the optional measuring station 80 and then to the respective block station 10, preferably selectively to one of the block stations 10.

Instead of the preferred individual conveying, the lenses 2 can also be conveyed in pairs. In particular, pairwise measuring in the measuring station 80 and/or pairwise blocking in the block station 10 then also takes place.

Preferably, the loading device 100 comprises a first lens conveying device 110 for conveying a lens 2 to be blocked from the conveying device 60 and/or the transport carrier 70, which is in the unloading position, to the measuring station 80, and/or a second lens conveying device 120 for conveying the lens 2 further to the respective block station 10.

Figure 9:
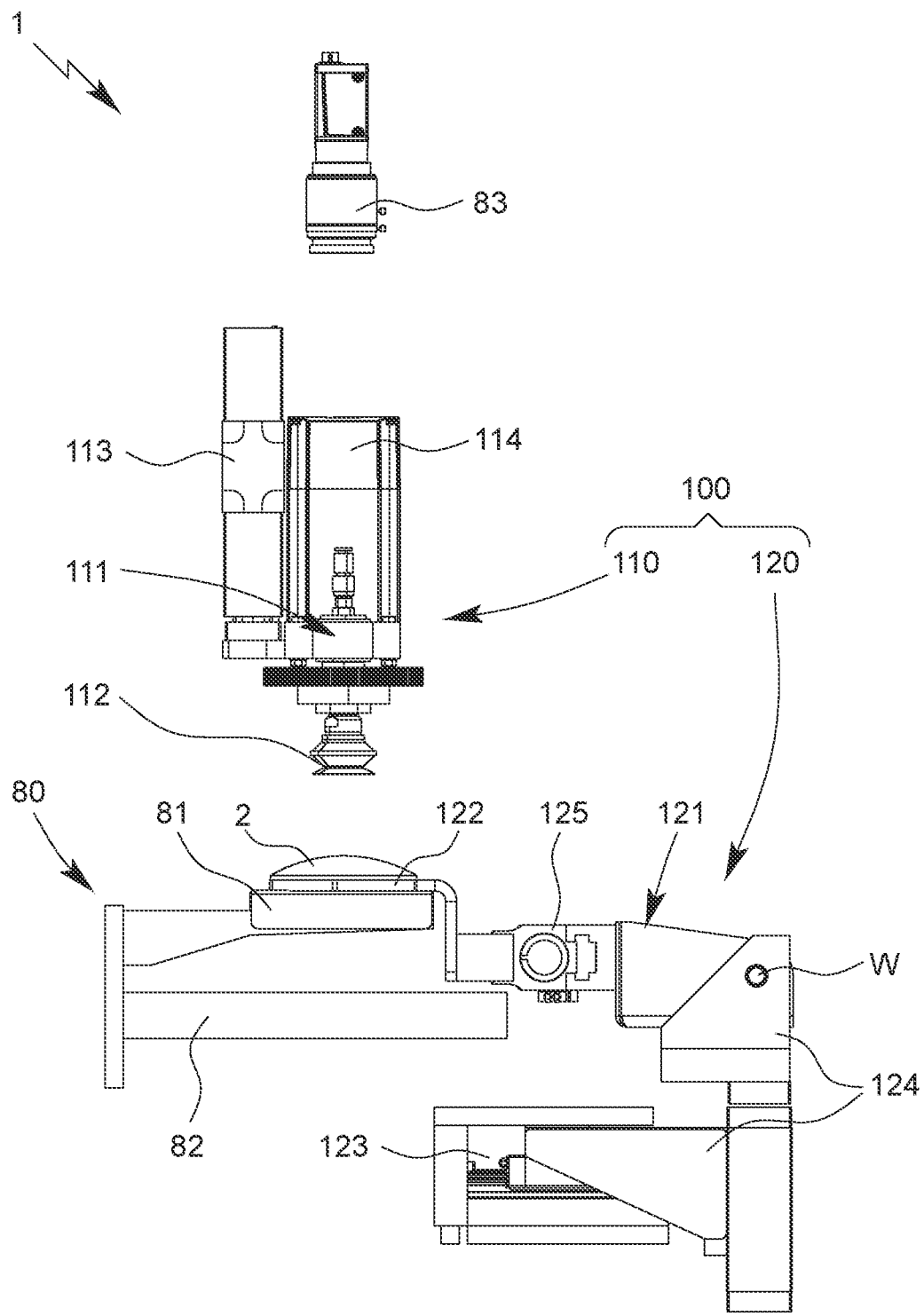
FIG. 9 a simplified side view of a loading device and measuring station of the apparatus.

FIG. 9 shows a schematic side view of a particularly preferred design or construction of the measuring station 80, which in particular has a measuring table or measuring support or measuring carrier 81, an illumination device 82 and/or a detection device or camera 83.

The lens 2 is preferably transferred to the measuring station 80 and/or placed on the measuring table or measuring carrier 81 of the measuring station 80, as indicated in FIG. 9.

The measuring station 80 preferably detects engravings and/or marks, markings and/or optical effect regions of the lens 2.

The measuring station 80 or its illumination device 82 preferably has a projector, screen or the like, which, for example, sends a pattern (stripe pattern or grid pattern) through the lens 2 or projects it onto the lens 2, so that the optical effect of the lens 2, as well as markings and engravings, are distorted and, accordingly, detection of the optical effect of the lens 2, of the engravings and markings and the like is made possible.

The illumination device 82 preferably illuminates or transilluminates the lens 2 with a stripe pattern or grid pattern—as required in the visible and/or invisible wavelength range and/or possibly also with different patterns and/or wavelengths—preferably from one side or from below. However, reflective measurement or illumination is also possible.

The detection device or camera 83 is preferably arranged on the opposite side and/or above the measuring carrier 81.

The measuring station 80 can preferably detect the type and/or the orientation of the lens 2 by means of the detection device or camera 83, in particular by evaluating the camera image. Here, in particular, it can be detected on which side the lens 2 is placed and/or in which rotational position and/or (other) position the lens 2 is placed. Furthermore, markings or other characteristics of the lens 2 can also be detected and/or evaluated.

The loading device 100 and/or the first and/or second lens conveying device 110 and/or 120 can be used to correct the position of the lens 2 in the measuring station 80, as needed. For example, the first lens conveying device 110 may pick up and rotate the lens 2 again and place it down again, if required. For example, the second lens conveying device 120 may grip the lens 2 circumferentially and center it. However, other manipulations are also possible.

In the example shown, the first lens conveying device 110 and the second lens conveying device 120 are preferably separate or separately operating conveying devices. This is conducive to optimized throughput and/or a simple design/construction with few axes of motion. However, the two can also be formed by a common device, for example a multi-axis robot arm or the like.

The loading device 100 and/or first lens conveying device 110 preferably has a first lens manipulator 111, in particular with a suction device 112 or other member for picking up and holding the lens 2, as indicated in FIGS. 8 and 9, in order to pick up a lens 2 to be blocked and transport it to the measuring station 80, in particular to deposit it or place it down there on the measuring carrier 81.

Preferably, the lens manipulator 111 is movable or positionable along a (first) linear axis L1 and/or guide or rail 113, in particular via a (sliding) carriage or slide 114 guided displaceably thereon and via a corresponding drive.

The lens manipulator 111 and/or the suction device 112 is preferably movable transversely or perpendicularly to the linear axis L1 and/or vertically, in particular in order to be able to lift and deposit the lens 2. This is done in particular via a suitable drive, such as a lifting cylinder or the like.

Further, the lens manipulator 111 or its suction device 112 or other holding member for the lens 2 is rotatable, in particular, about a vertical axis and/or the lens axis, in order to be able to align the lens 2 in its rotational position.

In particular, the loading device 100 or first lens conveying device 110 or first lens manipulator 111 or its suction device 112 is used to rotate the lens 2 after a first detection or measurement in the measuring station 80, if the lens 2 does not have the desired rotational position. For this purpose, the lens manipulator 111 picks up the lens 2 from the measuring carrier 81 again as a precaution and rotates it to the desired rotational position and then places it back on the measuring carrier 81.

This is optionally followed by a control measurement and/or further conveying of the lens 2 to the block station 10.

The loading device 100 and/or second lens conveying device 120 preferably has a second lens manipulator 121, in particular with a gripper 122 or other member for picking up and holding the lens 2, as indicated in FIGS. 8 and 9, in order to pick up a lens 2 to be blocked and to transport it in particular selectively to one of the block stations 10 and, in particular, to deposit it or place it down there on the block mold 20.

Preferably, the (second) lens manipulator 121 is movable or positionable along a (second) linear axis L2 and/or guide or rail 123, in particular via a (sliding) carriage or slide 124 guided displaceably thereon and via a corresponding drive.

In the example shown, the (second) lens manipulator 121 preferably has a swivel arm 125, which is arranged in particular so as to swivel about a turning axis W on the slide 124 or an extension arm attached thereto. The swivel arm 125 carries the gripper 122 of the lens manipulator 121, which is preferably designed as a centering gripper. In particular, the centering gripper 122 has two holding jaws which are movable relative to one another and which can grip a lens 2 circumferentially and center it in the process.

The loading device 100 and/or second lens conveying device 120 and/or (second) lens manipulator 121 is preferably designed in such a way that a lens 2 to be blocked can be taken from the measuring station 80—in particular from the measuring carrier 81—, that the lens 2 can be turned and/or that the lens 2 can be conveyed to the (desired) block station 10—in particular selectively to one of the block stations 10. In particular, the swivel arm 125 allows the lens 2 to be turned.

Usually, the lens 2 is fed by the conveying device 60 and/or by means of the transport carrier 70 in such a way that a flat side of the lens 2 that has already been processed or no longer requires mechanical processing is on top. The lens 2 is to be blocked with this side—the so-called block side—so that the other side can then be (mechanically) processed later after blocking.

The turning axis W for turning is preferably horizontal and/or preferably located between the lens center point on the measuring station 80 and the lens center point on the adjacent block station 10.

The swivel arm 125 together with the gripper 122 preferably bridges approximately the distance between the center of the lens on the measuring station 80 to the line on which the centers of the block openings 21 of the block mold(s) 20 lie. This results in a very simple design/construction. However, other constructive solutions are also possible.

The movement along the (second) linear axis L2 then enables the selective positioning of the lens 2 to be blocked on the selected block station 10 and/or corresponding block mold 20/block opening 21 of this block station 10.

By swiveling the swivel arm 125, the lens 2 can thus preferably be turned from its position on the measuring station 80 and, where appropriate, transferred directly to the opposite block station 10 without linear displacement, in particular deposited and/or positioned on the block mold 20.

However, instead of a movement and positioning along the (second) linear axis L2 for selecting the corresponding or other block station 10, another constructive solution, for example a movement of the block stations 10, can also be provided.

FIG. 9 shows the first lens conveying device 110 or the first lens manipulator 111 or its suction device 112 in the raised state and the second lens conveying device 120 or the second lens manipulator 121 or gripper 122 when detecting or positioning the lens 2 on the measuring station 80 or its measuring carrier 81.

Before a lens 2 to be blocked is fed to a block station 10 and/or before the lens 2 to be blocked is deposited/placed on the block mold 20 in the preferably provided horizontal feeding position, preferably a change of the the block opening 21 of the block mold 20 (if desired and/or necessary) and a feeding of the block station 10 or its receptacle 30 with a block piece 3 is carried out. This is preferably also done in the horizontal feeding position of the block station 10.

The block opening 21 is preferably changed automatically and/or motorized by means of the changing device 12, as already explained.

The preferred feeding of the block station 10 with the block piece 3 will be explained later. First, the process after blocking will be described in more detail.

The apparatus 1 has an unloading device 130, preferably operating independently of the loading device 100 and/or first lens conveying device 110 and/or second lens conveying device 120, for unloading the block station(s) 10 after blocking, thus for conveying away the blocked lens 2 and, in particular, for transferring it to the conveying device 60 and/or a transport carrier 70 (shown with dashed lines on the right side in FIG. 8 in a loading position for receiving a blocked lens 2).

The apparatus 1 preferably comprises a common loading device 100 and/or (second) lens conveying device 120 for conveying the lenses 2 to be blocked to the (plurality of) block stations 10.

The apparatus 1 preferably likewise has a common unloading device 130 with a (third) lens manipulator 131 for the (plurality of) block stations 10.

Figure 10:
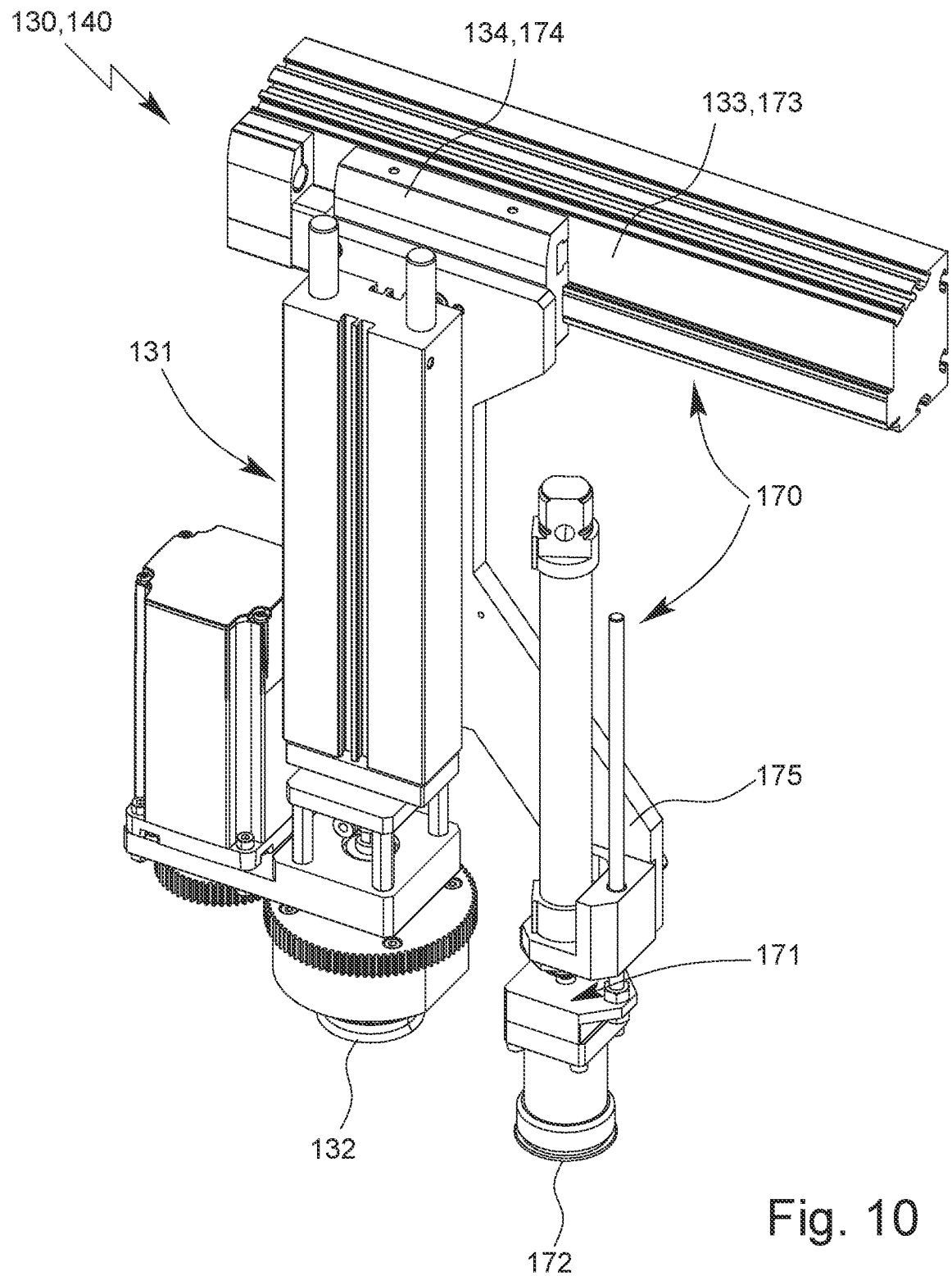
FIG. 10 a schematic view of an unloading device and a feeding device or block piece manipulator of the apparatus.

Preferably, the unloading device 130 and/or the (third) lens manipulator 131 has a suction device 132 or other member for picking up and holding the blocked lens 2, as schematically indicated in FIG. 10, in order to pick up a blocked lens 2 and transport it from the respective block station 10 to the conveying device 60, in particular to deposit or place it on the transport carrier 70.

Preferably, the (third) lens manipulator 131 is movable or positionable along a (third) linear axis L3 and/or guide or rail 133, in particular via a (sliding) carriage or slide 134 guided displaceably thereon and via a corresponding drive.

The (third) lens manipulator 131 or its suction device 132 or other member is preferably movable transversely or perpendicularly to the linear axis L3 and/or vertically, in particular in order to be able to lift and deposit the blocked lens 2 together with the block piece 3.

Furthermore, the third lens manipulator 131 or its suction device 132 or other holding member for the lens 2 is rotatable in particular about a vertical axis and/or the lens axis in order to be able to align the lens 2 in its rotational position as required before it is transferred or deposited on the transport carrier 70.

The first linear axis L1, second linear axis L2 and/or third linear axis L3 preferably run(s) at least substantially horizontally and/or transversely and/or perpendicularly to the conveying direction F of the conveying device 60 and/or parallel to each other.

The first and/or third guide or rail 113 and/or 133 preferably extend(s) over the conveying device 60, in particular to enable unloading and loading of the transport carriers 70 in a desired manner. However, other constructive solutions are also possible.

The swivel axis S of the block station(s) 10, the direction of movement B of the block mold(s) 20 for the opening change, the turning axis W of the loading device 100 or second lens conveying device 120 or swivel arm 125 and/or at least one of the linear axes L1, L2, L3 preferably run(s) at least substantially horizontally, parallel to one another and/or transversely or perpendicularly to the conveying direction F of the conveying device 60.

Particularly preferably, the block stations 10 and/or their block molds 20 and/or the centers of the block openings 21 of a block mold 20 or of all block molds 20 are arranged in a row or line that runs in particular parallel to the first, second and/or third linear axis L1, L2, L3 and/or transversely or perpendicularly to the conveying direction F of the conveying device 60 and/or of the transport carrier 70. This is conducive to a simple and/or compact design or construction.

The loading position of the transport carriers 70 is preferably in a straight line extension to the block stations 10 and/or block molds 20 and/or block openings 21.

The block stations 10 are preferably arranged along or parallel to the linear axis L2 and/or L3 for loading and/or unloading with lenses 2 and/or for feeding with block pieces 3.

Figure 11:
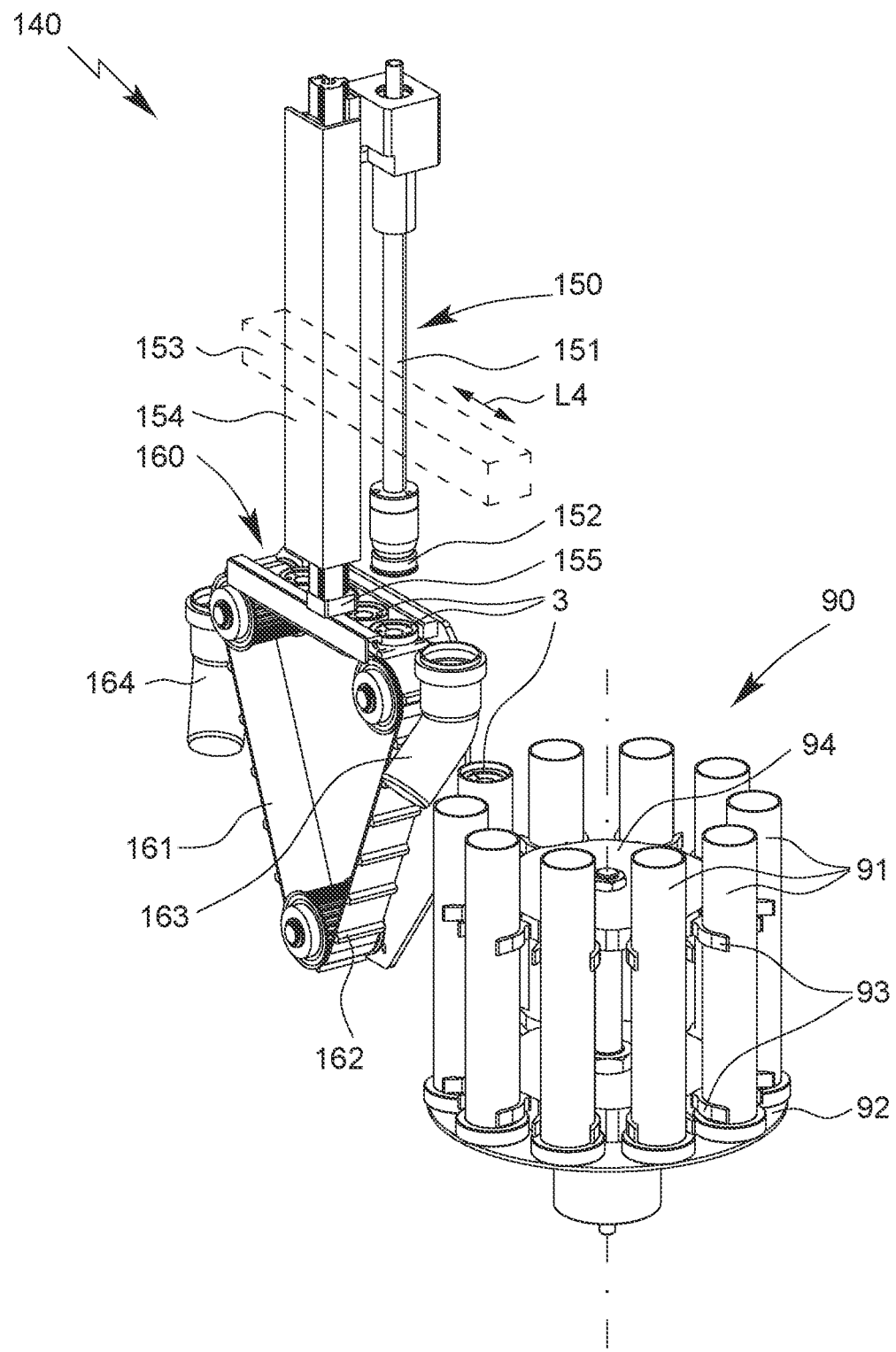
FIG. 11 a schematic side view of the feeding device and a magazine for block pieces.

Preferably, the apparatus 1 has a charging device or feeding device 140 for charging or feeding the block station(s) 10 with block pieces 3, as shown in FIGS. 8 and 10 and in the schematic side view according to FIG. 11.

The feeding device 140 is designed in particular in such a way that a block piece 3 can be removed from the magazine 90, preferably oriented in a defined or desired rotational position and fed to the respective block station 10 and/or receptacle 30, in particular inserted into the holder 31 of the respective receptacle 30.

The magazine 90 is preferably rotatable, in particular about a vertical axis.

In particular, the magazine 90 has tubular block piece receptacles 91 for receiving block pieces 3 in a stacked manner, as can be seen in FIG. 11. If required, the different block piece receptacles 91 can be equipped with different block pieces 3.

The block piece receptacles 91 preferably extend vertically and/or are open at the top.

By moving or rotating the magazine 90, a desired block piece receptacle 91 can be moved to a removal position so that a desired block piece 3 can be removed.

In the illustrative example, the block piece receptacles 91 are preferably arranged on a carrier or turntable 92 and/or held at a support plate 94.

The block piece receptacles 91 are preferably exchangeably and/or latchingly fastened, in particular attached or held by means of holding devices 93 to the magazine 90 and/or turntable 92 and/or support plate 94.

In the illustrative example, the apparatus 1 and/or feeding device 140 preferably has one or more block piece conveying devices, particularly preferably a (first) block piece conveying device 150, a (second) block piece conveying device 160 and/or a (third) block piece conveying device 170.

The first block piece conveying device 150 preferably has a first block piece manipulator 151, in particular with a suction device 152 or another member for picking up and holding a block piece 3, as indicated in FIGS. 8 and 11, in order to pick up a block piece 3 to be blocked, in particular from the magazine 90, and to pass it on with a defined rotational position, in particular to transfer it to the second block piece conveying device 160 or to deposit or place the block piece 3 thereon.

Preferably, the block piece manipulator 151 is movable or positionable along a linear axis L4 and/or guide or rail 153, in particular via a (sliding) carriage or slide 154 guided displaceably thereon and via a corresponding drive.

The block piece manipulator 151 or its suction device 152 or the other holding member is preferably movable transversely or perpendicularly to the linear axis L4 and/or vertically, in particular in order to be able to lift and deposit the block piece 3 accordingly.

The removal of a block piece 3 from the magazine 90 is carried out by the feeding device 140 and/or (first) block piece conveying device 150 and/or block piece manipulator 151. The removal is preferably carried out from above, in particular by means of the suction device 152 or another holding member of the block piece manipulator 151.

Further, the block piece manipulator 151 or its suction device 152 or other holding member for the block piece 3 is in particular rotatable about a vertical axis and/or the block piece axis in order to be able to align the block piece 3 in its rotational position.

To align the block piece 3 in a desired rotational position, the apparatus 1 or feeding device 140 or block piece conveying device 150 or first block piece manipulator 151 is preferably provided with a sensor device 155, which can in particular optically detect a rotational position of the block piece 3, for example by means of an orientation groove or the like.

After removal from the magazine 90, the block piece 3 can be positioned in front of the sensor device 155 to rotate the block piece 3 to the desired rotational position.

Particularly preferably, the sensor device 155 is arranged on the slide 154. In this way, the block piece 3 can be positioned very simply by lifting it directly in front of or adjacent to the sensor device 155 and rotated to the desired rotational position.

In addition, the linear movement towards the (second) block piece conveying device 160 can take place simultaneously during the rotational alignment to enable the block piece 3 to be transferred as quickly as possible.

In the illustrative example, the (second) block piece conveying device 160 is preferably designed as an in particular linear conveyor or conveyor belt 161 and/or for segmenting or separating the block pieces 3.

The block piece 3, which is preferably aligned in its rotational position, is deposited or placed by the first block piece conveying device 150 preferably on the block piece conveying device 160 or on the conveyor (belt) 161.

Particularly preferably, the conveyor belt 161 is provided with orientation means, such as cams and/or longitudinal or transverse ribs 162, as indicated in FIG. 11, to ensure the desired rotational orientation of the block pieces 3 on the conveyor belt 161. However, other constructive solutions are also possible here.

The (second) block piece conveying device 160 and/or the conveyor belt 161 then conveys the block pieces 3 one after the other—in particular underneath the third guide or rail 133—to a pick-up position for the (third) block piece conveying device 170.

If the magazine 90 is arranged on the other side of the third guide or rail 133, thus in particular upstream in conveying direction F and/or on the left side in FIG. 8, the conveyor belt 161 is not guided underneath the third guide or rail 133, but if required in particular underneath the first guide or rail 113.

Irrespective of this, the feeding device 140 and/or the conveyor belt 161 for the block pieces 3 is preferably arranged between the block station 10 and the conveying device 60 and/or the conveyor belt 161 preferably runs parallel to the conveying direction F and/or conveying device 60.

The (second) block piece conveying device 160 and/or the conveyor belt 161 conveys block pieces 3 one after the other to a pick-up position for transfer to the (third) block piece conveying device 170. The pick-up position is preferably located between the first guide or rail 113 on the one hand and the third guide or rail 133 on the other hand and/or between the block station 10 and the conveying device 60. However, other arrangements are also possible.

If the rotational position of a block piece 3 cannot be clearly detected or the block piece 3 cannot be used for other reasons, the block piece 3 can be discharged from the first block piece conveying device 150 and/or block piece manipulator 151 to a (first) collecting device 163 indicated in FIG. 11, for example by dropping it. This collecting device 163 or collecting position is preferably arranged directly in front of the conveyor belt 161 and/or between the magazine 90 and the conveyor belt 161. However, other constructive solutions are also possible. For example, a (second) collecting device 164 can alternatively or additionally be arranged immediately downstream of the conveyor belt 161 in order to be able to receive unusable block pieces 3, for example those that cannot be picked up—in particular by tipping at the end of the conveyor (belt) 61.

According to an embodiment variant not shown, the block pieces 3 properly detected by the (first) block piece conveying device 150 are deposited/placed on the conveyor belt 161 at such a distance from each other and/or the orientation means or transverse ribs 162 are spaced in such a way that block pieces 3 which are no longer to be used further, for example block pieces 3 which cannot be correctly oriented or block pieces 3 which have other defects, are or can be deposited/placed therebetween on the conveyor belt 161, in order to then no longer position them in the said pick-up position for transfer to the block piece conveying device 170, but to be able to deliver them or tip them off at the end of the conveyor belt 161 by conveying them further to the collecting device 164.

This enables a very simple implementation, wherein in particular the (first) collecting device 163 can be omitted.

Instead of the variant with three deflections shown in FIG. 11, an implementation with only two deflections for the conveyor belt 161 is also possible.

The (third) block piece conveying device 170 preferably has a block piece manipulator 171, in particular with a suction device 172 or another holding member for picking up and holding the block pieces 3, in order to be able to pick up a block piece 3 from the (second) block piece conveying device 160 and/or the conveyor belt 161—in particular from the pick-up position located on the left in the illustrative example in FIG. 8—and to feed the block piece 3 to the corresponding block station 10 and/or receptacle 30 and thus to equip or charge or feed the block station 10 with the block piece 3 for the next blocking.

The apparatus 1 and/or feeding device 140 and/or (second) block piece conveying device 160 preferably has a sensor device not shown in order to determine whether a block piece 3 or which block piece 3 is in the pick-up position and/or at or on the respective orientation means for pick-up by the block piece conveying device 170. Accordingly, it can be decided thereby whether the block piece 3 is picked up by the (third) block piece conveying device 170 and transferred to the block station 10 or is instead delivered or tipped off to the collecting device 164 by further conveying.

Preferably, the block piece manipulator 171 is also movable or positionable along a linear axis and/or guide or rail 173 and/or by means of a (sliding) carriage or slide 174, in particular along the third linear axis L3 and/or guide or rail 133.

The block stations 10 are preferably arranged in a row or one behind the other in such a way that the (third) block piece manipulator 171 can be positioned linearly selectively over one of the block stations 10 and/or over the respective receptacle 30.

Particularly preferably, the (second) block piece manipulator 171 is movable or displaceable together with the (third) lens manipulator 131, in particular mechanically fixedly coupled, for example via a connecting part 175, and/or arranged on the same or common slide 134, as shown in FIG. 10.

The block piece manipulator 171 or its suction device 172 or its other holding member is preferably movable transversely or perpendicularly to the third linear axis L3 and/or vertically, in particular in order to be able to lift and deposit the block piece 3.

The feeding device 140 is designed in particular for feeding the block station(s) 10 individually with block pieces 3. However, feeding in pairs is also possible in principle.

The block pieces 3 are preferably segmented or separated before and/or for being provided in the pick-up position for equipping the block station 10, in particular by means of the second block piece conveying device 160 and/or the conveyor belt 161.

The storage of the block pieces 3 in the magazine 90, the removal and orientation of the block pieces 3, in particular into a desired rotational position, and the separation of the block pieces 3 is preferably performed by means of separate devices, in particular the magazine 90, the first block conveying device 150 and the second block piece conveying device 160.

In general, it should be noted that the lenses 2 to be blocked are fed to the block stations 10, in particular alternately, by means of the preferably common loading device 100.

The blocked lenses 2 are preferably conveyed away from the block stations 10 by the separate and/or common unloading device 130.

After unloading a block station 10 (conveying away the blocked lens 2), the block station 10 or its receptacle 30 is first reloaded or recharged with a block piece 3. This is preferably done by means of the (third) block piece conveying device 170, which is in particular combined with the unloading device 130. Particularly preferably, namely, the pick-up position for feeding the block station 10 with a new block piece 3 and/or for the (third) block piece conveying device 170 is located between the conveying device 60 or transport carrier 70 in the loading position on the one hand and the at least one block station 10 on the other hand. Thus, during the return path (after a blocked lens 2 has been deposited in the transport carrier 70), the next block piece 3 can be transported directly to the block station 10 to be equipped.

Subsequently, the unloading device 130 or its lens manipulator 131 can then be immediately moved on to the next block station 10 to unload it.

This results in an optimized process with high throughput, in particular since the loading of the block station 10 with lenses 2 to be blocked and/or the change from one block size to another block size take place independently thereof.

Preferably, the apparatus 1 comprises a frame, not shown, for said devices and stations and/or a housing, not shown, for at least partially and/or at least substantially completely enclosing said devices and stations.

Further aspects and methods according to the proposal for blocking a lens 2 that can also be implemented independently are characterized in particular by the following, a) in that the loading and unloading of the block station(s) 10, thus the feeding with lenses 2 to be blocked and the conveying away of blocked lenses 2, is carried out independently of one another and/or by means of separate devices 100, 130 and/or b) in that feeding of the block station(s) 10 with block pieces 3 is carried out independently of the loading with lenses 2 to be blocked and/or c) in that the block piece preparation, namely pick-up from a magazine, turning into a desired rotational position and positioning in a pick-up position for direct feeding to a block station 10 is carried out independently of the unloading of the block station(s) 10 after blocking and/or d) in that a block mold 20 and/or the block opening 21 of the block mold 20 is carried out only by transverse displacement and/or automatically by means of a dedicated—i.e. only intended for this purpose—changing device 12 and/or e) in that the block stations 10 and/or block molds 20 and/or their block openings 21 are arranged in a line, wherein the loading with lenses 2 to be blocked is carried out with a guide or rail 113 and/or 123 from one side and the unloading of the blocked lenses 2 and/or the feeding with block pieces 3 is carried out with a guide or rail 133 from the other side and/or transversely or perpendicularly to the conveying direction F of the conveying device 160.

Individual aspects and features of the proposed apparatus 1 and the proposed block mold 20 for blocking lenses 2 can also be implemented independently of each other, but also in any combination.

| List of reference signs: | |
|---|---|
| 1 | Apparatus |
| 2 | Lens |
| 3 | Block piece |
| 4 | Block material |
| 10 | Block station |
| 11 | Carrier |
| 12 | Changing device |
| 13 | Changing drive |
| 14 | Guide |
| 15 | Hold-down device |
| 16 | Holder drive |
| 17 | Swivel bearing |
| 18 | Swivel drive |
| 19 | Connection part |
| 20 | Block mold |
| 21 | Block opening |
| 22 | Edge |
| 23 | Block insert |
| 24 | Feed opening |
| 25 | Overflow |
| 26 | Recess |
| 27 | Coolant connection |
| 28 | Coolant channel |
| 29 | Cover |
| 30 | Receptacle |
| 31 | Holder |
| 32 | Bearing housing |
| 33 | Rotary drive |
| 34 | Gear |
| 35 | Plunger |
| 36 | Axial spring |
| 37 | Actuator |
| 38 | Return spring |
| 39 | Holding region |
| 40 | Block material feed |
| 41 | Feed head |
| 42 | Feeding tip |
| 43 | Shut-off valve |
| 44 | Block material line |
| 45 | Level sensor |
| 46 | Reservoir |
| 50 | Cooling device |
| 51 | Coolant line |
| 60 | Conveying device |
| 70 | Transport carrier |
| 80 | Measuring station |
| 81 | Measuring carrier |
| 82 | Illumination device |
| 83 | Camera |
| 90 | Magazine |
| 91 | Block piece receptacle |
| 92 | Turntable |
| 93 | Holding device |
| 94 | Support plate |
| 100 | Loading device |
| 110 | First lens conveying device |
| 111 | First lens manipulator |
| 112 | Suction device |
| 113 | Rail |
| 114 | Slide |
| 120 | Second lens conveying device |
| 121 | Second lens manipulator |
| 122 | Gripper |
| 123 | Rail |
| 124 | Slide |
| 125 | Swivel arm |
| 130 | Unloading device |
| 131 | Third lens manipulator |
| 132 | Suction device |
| 133 | Rail |
| 134 | Slide |
| 140 | Feeding device |
| 150 | First block piece conveying device |
| 151 | First block piece manipulator |
| 152 | Suction device |
| 153 | Rail |
| 154 | Slide |
| 155 | Sensor device |
| 160 | Second block piece conveying device |
| 161 | Conveyor belt |
| 162 | Transverse rib |
| 163 | First collecting device |
| 164 | Second collecting device |
| 170 | Third block piece conveying device |
| 171 | Block piece manipulator |
| 172 | Suction device |
| 173 | Rail |

List of reference signs:

| | |
|---|---|
| 174 | Slide |
| 175 | Connecting part |
| B | Direction of movement |
| C | Axis of rotation |
| D | Diameter |
| E | Plane |
| F | Conveying direction |
| H | Axial height |
| L1 | First linear axis |
| L2 | Second linear axis |
| L3 | Third linear axis |
| L4 | Fourth linear axis |
| S | Swivel axis |
| W | Turning axis |

What is claimed is:

1. An apparatus configured to block a lens on a block piece by a block material, the apparatus comprising:
 a block station;
 a loading device configured to feed a lens to be blocked to the block station;
 a charging device configured to charge the block station with a block piece; and
 a block material feeding device configured to feed block material to the block station,
 wherein the block station comprises a block mold configured to laterally delimit a space, to be filled by the block material feeding device with block material, between the lens and the block piece and,
 wherein the block mold has a plurality of block openings for forming different block sizes.

2. The apparatus according to claim 1, wherein the apparatus has a receptacle to hold the block piece during blocking, and the block mold is movable relative to the receptacle for changing the block opening.

3. The apparatus according to claim 2, wherein the block mold is movable only transversely to the receptacle for changing the block opening.

4. The apparatus according to claim 2, wherein the block mold is movable in a plane only parallel to a block opening plane and/or only in its plate plane, or linearly to change the block opening.

5. Apparatus according to claim 1, wherein the apparatus has a changing device, a dedicated changing drive and/or a guide for moving and/or displacing the block mold and/or for changing between different block openings to form different block sizes.

6. The apparatus according to claim 1, wherein the apparatus comprises a cooling device for cooling the block mold.

7. The apparatus according to claim 6, wherein in that the cooling device is configured for supplying a coolant to the block mold.

8. Apparatus according to claim 1, wherein the block openings differ from each other in diameter and/or in axial height to form the different block sizes.

9. Apparatus according to claim 1, wherein the apparatus comprises different block inserts provided to the block openings to form the different block sizes.

10. Apparatus according to claim 1, wherein the block mold is at least substantially plate-shaped.

11. Apparatus according to claim 1, wherein the block openings each have an axially projecting collar or edge.

12. Apparatus according to claim 11, wherein the axially projecting collar or edge is on an underside of the block mold.

13. Apparatus according to claim 1, wherein the block openings or block inserts receivable or received therein differ in their diameter and/or their axial height.

14. Apparatus according to claim 1, wherein the block mold has, for each of the block openings, a respective feed opening and/or an overflow for the block material.

15. Apparatus according to claim 1, wherein the block mold has at least one cooling channel.

16. The apparatus according to claim 5, wherein the apparatus has a carrier which carries the block mold as well as the changing device, the changing drive, the guide and/or a receptacle for the block piece.

17. An apparatus configured to block a lens on a block piece by a block material, the apparatus comprising:
 a block station;
 a loading device configured to feed a lens to be blocked to the block station;
 a charging device configured to charge the block station with a block piece; and
 a block material feeding device configured to feed block material to the block station,
 wherein the block station comprises a block mold configured to laterally delimit a space between the lens and the block piece for the block material,
 wherein the apparatus further comprises a changing device, a dedicated changing drive and/or a guide configured to automatically change between different block openings to form different block sizes.

18. An apparatus configured to block a lens on a block piece by a block material, the apparatus comprising:
 a block station;
 a loading device configured to feed a lens to be blocked to the block station;
 a charging device configured to charge the block station with a block piece; and
 a block material feeding device configured to feed block material to the block station,
 wherein the block station comprises a block mold configured to laterally delimit a space between the lens and the block piece for the block material,
 wherein the block mold is plate-shaped and has at least one block opening for forming a block size and has at least one cooling channel.

19. Apparatus according to claim 18, wherein the block mold has a plurality of block openings for forming different block sizes.

* * * * *